ABSTRACT# United States Patent [19]

Holland

[11] 3,811,602
[45] May 21, 1974

[54] PARTICULATE MATERIAL RETAINING GATE
[75] Inventor: John H. Holland, Norman, Okla.
[73] Assignee: Arkansas Rock and Gravel Co., McAlester, Okla.
[22] Filed: Aug. 17, 1972
[21] Appl. No.: 281,388

[52] U.S. Cl................ 222/178, 214/83.18, 222/415, 222/547, 222/556
[51] Int. Cl............................................. B60p 1/38
[58] Field of Search....... 222/1, 176, 177, 178, 408, 222/415, 476, 545, 547, 556, 557, 558, 564; 214/83.18, 83.2, 83.36; 296/33, 24 R; 280/5 F

[56] References Cited
UNITED STATES PATENTS

| 3,490,623 | 1/1970 | Steckelberg | 214/83.2 |
| 954,850 | 4/1910 | Burme | 222/556 |
| 3,578,283 | 5/1971 | Jones | 222/556 X |

FOREIGN PATENTS OR APPLICATIONS

| 667,057 | 1/1950 | Great Britain | 214/83.18 |

Primary Examiner—Stanley H. Tollberg
Assistant Examiner—Larry Martin

[57] ABSTRACT

A particulate material delivery vehicle includes a semi-trailer chassis comprising opposed side walls and a floor. The side walls and the floor define a generally V-shaped particulate material receiving hopper and extend beyond the rear end of the hopper to define a discharge chute. An endless conveyor is supported on the semitrailer chassis for movement around a course extending through the hopper and through the discharge chute to unload particulate material from the hopper through the discharge chute and to discharge particulate material from the extreme rear end of the vehicle.

A particulate material retaining gate is supported on the semitrailer chassis between the particulate material receiving hopper and the discharge chute. The gate comprises a plate which is substantially identical in cross-section to the particulate material receiving hopper and which is pivotally supported on the chassis for movement between a closed position wherein it blocks the rear end of the hopper and an open position wherein it permits flow of particulate material out of the hopper and through the discharge chute under the action of the endless conveyor. During transportation of particulate material into the vehicle the plate is retained in the closed position and functions to retain the particulate material in the hopper. Subsequently the plate is released to the open position whereupon the conveyor is actuated to unload the vehicle.

16 Claims, 2 Drawing Figures

PATENTED MAY 21 1974　　　　　　　　　　　　　　　　　　　3,811,602

3,811,602

PARTICULATE MATERIAL RETAINING GATE

BACKGROUND OF THE INVENTION

This invention relates to particulate material retaining gates, and more particularly to a gate for controlling the positioning of particulate material in a delivery vehicle during transportation.

In U. S. Pat. No. 3,647,096, issued to John H. Holland, a particulate material delivery vehicle is disclosed in the form of a semitrailer chassis. The chassis defines a generally V-shaped particulate material receiving hopper and a discharge chute extending rearwardly from the hopper. An endless conveyor is supported on the chassis for movement around a course including a portion extending through the hopper and through the discharge chute. The conveyor is therefore operable to unload the vehicle by transporting particulate material rearwardly out of the hopper and through the discharge chute and discharging the material from the extreme rear end of the vehicle.

It has been found that the particulate material delivery vehicle disclosed in the above-identified application is satisfactory for transporting and delivering relatively low-slump particulate materials, such as hot asphalt, gravel, sand, and the like, because these materials exhibit a definite tendency not to flow rearwardly out of the hopper and into the discharge chute unless the rear wall of the hopper is substantially open. Since most of the particulate material is positioned forwardly of a wheel assembly that supports the rear end of the semitrailer chassis, the vehicle is capable of transporting a maximum amount of particulate material within the limitations imposed by bridge and highway regulations, and at the same time to so position the load that it can be held in a relatively forward position during unloading so as to reduce rearward weight transfer and thereby increase handling ease.

On the other hand, certain problems have been encountered when particulate material delivery vehicles incorporating the above-identified Holland invention are utilized to transport higher slump materials, such as slip-form concrete and the like. Concrete exhibits a marked tendency to flow rearwardly out of the hopper and into the discharge chute. This is troublesome because the discharge chute can become jammed, whereby the endless conveyor cannot be operated to unload the particulate material delivery vehicle. Particulate material can also flow rearwardly to such an extent that it falls out of the rear end of the discharge chute. More importantly, any rearward flow of particulate material out of the hopper and into the discharge chute distributes the total weight of the vehicle more rearwardly than would otherwise be the case. This tends to increase the load on the wheel assembly that supports the rear of the semitrailer chassis, and this in turn restricts the total amount of particulate material that can lawfully be transported in the particulate material delivery vehicle.

The present invention relates to an improvement over the particulate material delivery vehicle disclosed in the above-identified invention of John H. Holland which adapts the vehicle for the transportation of slip-form concrete and similar particulate materials while preserving axle weight distribution as well as maintaining the discharge chute in an empty condition, so that particulate material has sufficient space to assume a constant cross-section and be metered from the trailer under complete control in accordance with the teachings of my previous application. In accordance with the broader aspects of the invention a particulate material delivery vehicle constructed substantially in accordance with the Holland invention is equipped with gate structure supported on the chassis between the particulate material receiving hopper and the discharge chute. During transportation of high-slump particulate materials the gate structure is retained in a closed position and functions to prevent particulate material from flowing rearwardly out of the hopper and into the discharge chute. The gate structure is subsequently released to an open position whereupon particulate material is permitted to flow out of the particulate material receiving hopper and through the discharge chute as a consequence of the operation of the endless conveyor.

More specifically, the gate structure comprises a plate having a shape substantially identical to the cross-section of the particulate material receiving hopper. The plate is pivotally supported on the semitrailer chassis and is provided with a cutaway portion aligned with a baffle in the hopper so that particulate material does not become trapped between the plate and the baffle. A member extends arcuately rearwardly and upwardly in the discharge chute from the rear end of the baffle through the cutaway portion of the plate. Latching structure is mounted on the plate for engagement with the upwardly and rearwardly extending member to retain the plate in the closed position and to release the plate to the open position prior to actuation of the endless conveyor means.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
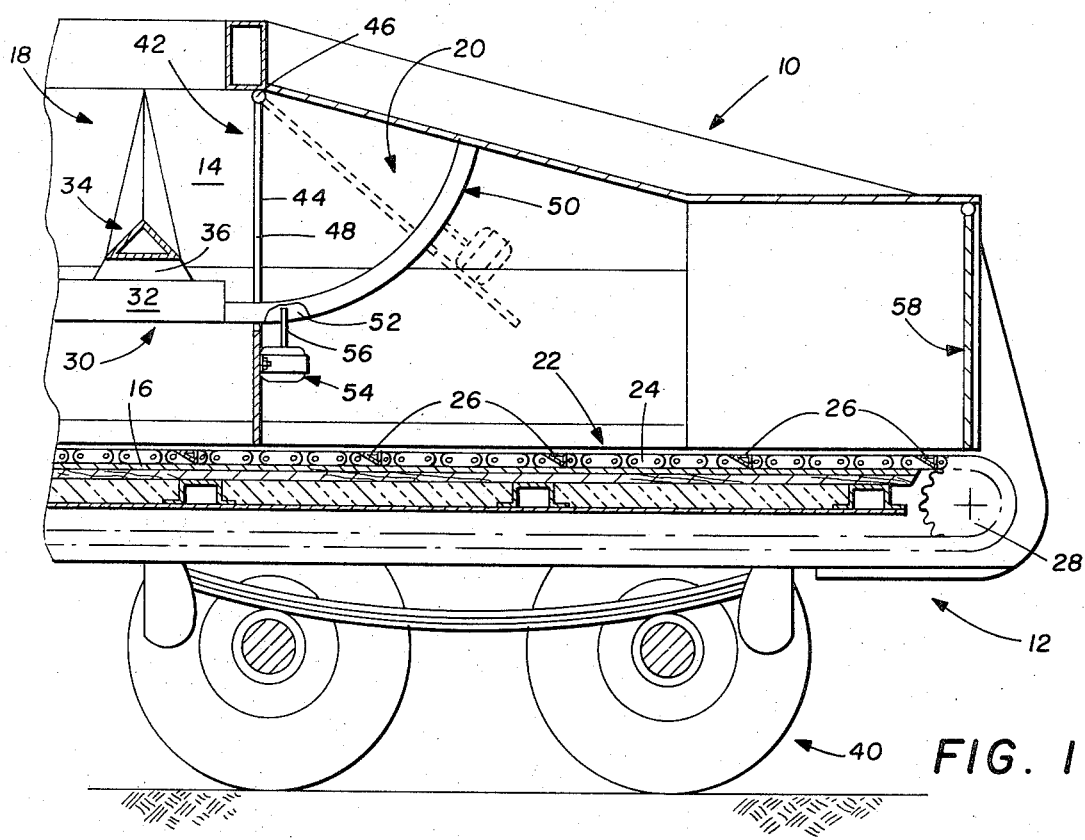
FIG. 1 is a longitudinal sectional view of a particulate material delivery vehicle showing a particulate material retaining gate incorporating the invention.

Referring now to the drawings, there is shown a particulate material delivery vehicle 10 constructed in accordance with and incorporating the invention disclosed and claimed in the copending application of John H. Holland Ser. No. 241,315 filed Apr. 5, 1972, for Particulate Material Delivery Vehicle Construction. The particulate material delivery vehicle 10 comprises a semitrailer chassis 12 including opposed side walls 14 and a floor 16. The side walls 14 and the floor 16 cooperate to define a generally V-shaped particulate material receiving hopper 18 which is centrally disposed lengthwise of the semitrailer chassis 12. The side walls 14 and the floor 16 also extend beyond the rear end of the particulate material receiving hopper 18 to define a discharge chute 20. The construction of the side walls 14 and the floor 16 of the semi-trailer chassis 12 is fully set forth in the specification of the above-identified application of John H. Holland the disclosure of which is incorporated herein by reference.

The particulate material delivery vehicle 10 further includes an endless conveyor 22 comprising a pair of drive chains 24 and a plurality of flights 26 connected between the drive chain 24. The drive chains 24 extend around sprockets 28 which are mounted at the front end and at the rear end of the semi-trailer chassis 12 to define the course of the conveyor 22. The conveyor course includes a portion extending through the bottom of the particulate material receiving hopper 18 and through the bottom of the discharge chute 20 just above the floor 16.

The conveyor 22 is driven by a hydraulic motor which is connected to the rear sprockets 28 through a speed reducer. Upon operation of the motor, the drive chains 24 are actuated to move the flights 26 rearwardly through the bottom of the particulate material receiving hopper 18 and through the bottom of the discharge chute 20. By this means the conveyor 22 operates to unload particulate material from the particulate material receiving hopper 18 through the discharge chute 20 and to discharge the particulate material from the extreme rear end of the semitrailer chassis 12. A more complete understanding of the construction and operation of the conveyor 22 may be had by the copending application of John H. Holland, Ser. No. 206,634, filed Dec. 10, 1971, for Conveyor System.

Figure 2:
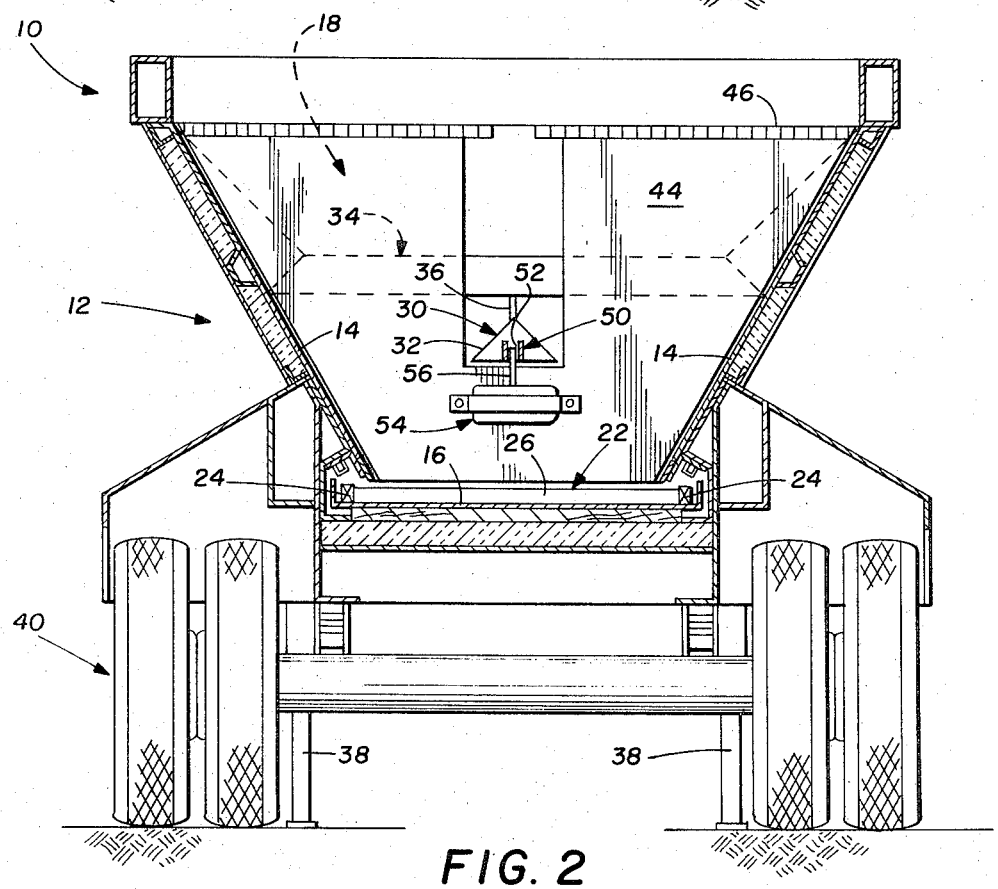
FIG. 2 is a sectional view taken generally along the line 2—2 in the direction of the arrows.

The particulate material receiving hopper 18 of the particulate material delivery vehicle 10 is provided with a baffle 30 which extends lengthwise in the hopper 18 above the floor 16 and between the side walls 14. As best shown in FIG. 2, the baffle 30 is triangular in cross section and comprises opposed surfaces 32 which extend angularly downwardly and outwardly. The surfaces 32 of the baffle 30 cooperate with the angularly downwardly and inwardly extending side walls 14 of the particulate receiving hopper 18 to form a zone of increased horizontal pressure in particulate material in the hopper 18. This increased horizontal pressure zone tends to cause bridging of particulate material between the baffle 30 and the side walls 14. The baffle 30 also forms a zone of decreased horizontal pressure in particulate material in the hopper 18 located just beneath the increased horizontal pressure zone and tending to prevent bridging of particulate material in the hopper 18. There is thus formed a preferential shear zone in particulate material in the hopper 18, whereby the conveyor 22 functions to transport particulate material rearwardly in the hopper 18 and through the discharge chute 20 at a predetermined height corresponding to the vertical positioning of the baffle 30 in the particulate material receiving hopper 18.

The baffle 30 is supported in the particulate material receiving hopper 18 by a front wall of the hopper and by a pair of baffle support members 34. The baffle support members 34 are positioned in the center and at the rear end of the hopper 18 and function to support the central portion and the rear portion of the baffle 30, respectively. As best shown in FIG. 2, the baffle support members 34 extend transversely through the particulate material receiving hopper 18 and are connected to the baffle by vertically extending webs 36.

It has been found that due to the preferential shear zone which is formed in particulate material in the hopper 18 by the baffle 30, the conveyor 22 usually functions to move the lower portion of a load of particulate material in the hopper rearwardly while the upper portion of the load remains stationary. This results in a metering effect directly related to the height of the baffle which effect allows for close control of material delivery volume without resorting to transverse strike-off of the flowing material which is costly in terms of power requirements and component weight. However, in the case of certain particulate materials the upper portion of the load tends to move rearwardly with the lower portion of the load under the action of the conveyor 22.

This phenomenon is particularly noticeable when the hopper 18 has been substantially completely unloaded.

Any tendency of particulate material in the upper portion of the particulate material receiving hopper 18 to move rearwardly can be very disadvantageous. Thus, if the particulate material in the upper portion of the hopper moves far enough rearwardly, if can become jammed in the discharge chute 20. This in turn can result in the application of such high loads on the conveyor 22 that it is impossible to unload additional particulate material from the particulate material delivery vehicle 10. Also, jamming of particulate material in the discharge chute 20 can occur very rapidly, in which case one or more components of the conveyor 22 may fail before it is possible to terminate operation of the conveyor 22.

It has been found in addition to supporting the baffle 30, the baffle support members 34 function to prevent any rearward movement of particulate material in the upper portion of the particulate material receiving hopper 18. Since the baffle support members 34 extend transversely in the hopper 18, any particulate material in the upper portion of the hopper 18 tending to move rearwardly under the action of the conveyor 22 immediately engages one of the baffle support members 34 and is thereafter prevented from further rearward movement. By this means the conveyor 22 continues to transport particulate material rearwardly in the hopper 18 and through the discharge chute 20 at the predetermined height determined by the vertical positioning of the baffle 30, and any possibility of jamming of particulate material in the discharge chute 20 is completely eliminated.

As will be appreciated by those skilled in the art, the front end of the semitrailer chassis 12 of the particulate material delivery vehicle 10 comprises a gooseneck including apparatus for connection to a conventional semitrailer contact plate of a tractor. The tractor therefore normally supports the front end of the semitrailer chassis 12. The tractor also supplies operating power for transporting the particulate material delivery vehicle 10 and for driving the endless conveyor 22. As is best shown in FIG. 2, a pair of conventional landing gears 38 are provided for supporting the front end of the semitrailer chassis 12 whenever it is not connected to a tractor.

The rear end of the semitrailer chassis 12 is supported by a conventional wheel assembly 40. It will be noted that the wheel assembly 40 is mounted at the extreme rear end of the semi-trailer chassis 12 beneath the discharge chute 20. Stated another way, the particulate material receiving hopper 18 of the particulate material delivery vehicle 10 is located substantially entirely forwardly of the wheel assembly 40.

In the particulate of the invention it has been found that whenever the particulate material receiving hopper 18 is filled with a relatively low-slump particulate material, for example, hot asphalt, rock, gravel, sand, etc., the material does not exhibit any marked tendency to flow rearwardly out of the hopper 18 and into the discharge chute 20 even though the semitrailer chassis 12 may be vibrated to a substantial degree during transportation. This is desirable because if the particulate material remains in the hopper 18, the weight of the particulate material is centrally disposed lengthwise of the semitrailer chassis 12. This in turn maximizes the amount of particulate material that can be transported by the particulate material delivery vehicle 10 within the limitation imposed by bridge and highway regulations.

On the other hand, it has been found that if the particulate material receiving hopper 18 of the vehicle 10 is loaded with a high-slump particulate material such as slip-form concrete, the particulate material tends to flow rearwardly out of the hopper 18 and into the discharge chute 20. This is particularly true during vibration of the semitrailer chassis 12 due to transportation of the particulate material delivery vehicle 10.

Any rearward flow of particulate material out of the hopper 18 and into the discharge chute 20 is disadvantageous for a number of reasons. For example, the particulate material can become jammed in the discharge chute 20, in which event the conveyor 22 may become loaded to such an extent that it is impossible to unload the particulate material delivery vehicle 10. Such jamming of the discharge chute 20 can occur very rapidly, in which case the conveyor 22 can fail before it is possible to terminate its operation. Alternatively, the particulate material may flow rearwardly in the discharge chute 20 to such an extent that it flows out of the rear end of the discharge chute 20. Perhaps more importantly, rearward flow of particulate material out of the particulate material receiving hopper 18 and into the discharge chute 20 redistributes the weight of the particulate material rearwardly relative to the semitrailer chassis 12. Any such rearward redistribution of the overall weight of the particulate material delivery vehicle 10 tends to reduce the maximum amount of particulate material that can be transported in the vehicle within the limitations imposed by bridge and highway regulations.

The problem of high-slump particulate materials flowing rearwardly out of the particulate material receiving hopper 18 and into the discharge chute 20 is overcome in the particulate material delivery vehicle 10 by a particulate material retaining gate 42. The retaining gate 42 is mounted on the semitrailer chassis 12 between the particulate material receiving hopper 18 and the discharge chute 20 and functions to retain particulate material in the hopper 18 during transportation of the particulate material delivery vehicle 10. Thereafter the gate structure 42 is actuated to release the particulate material for transportation out of the hopper 18 and through the discharge chute 20 under the action of the conveyor 22.

More particularly, the particulate material retaining gate 42 comprises a plate 44 which is substantially identical in shape to the cross-section of the particulate material receiving hopper 18. The plate 44 is supported at the rear end of the particulate material receiving hopper 18 by a piano-type hinge 46 which extends across the entire width of the upper portion of the semitrailer chassis 12. By this means the plate 44 is mounted on the semitrailer chassis 12 for pivotal between the closed position shown in full lines in FIG. 1 and the open position shown in dashed lines in FIG. 1.

As is best shown in FIG. 2, the plate 44 is provided with a cutaway portion 48 aligned with the baffle 30 in the particulate receiving hopper 18. This is to prevent particulate material from becoming trapped between the plate 44 and the rear end of the baffle 30 and thereby preventing the movement of the plate 44 to the closed position. A member 50 extends arcuately upwardly and rearwardly from the baffle 30 and is concentric with the hinge 46. The member 50 has a hole 52 formed through it and the plate 44 is equipped with a latch mechanism 54 including a latch pin 56 mounted for engagement with the hole 52 in the member 50 to retain the plate 44 in the closed position. The latch mechanism 54 illustrated in the Drawings comprises a pneumatic "biscuit" of a type commonly utilized in semitrailers and similar vehicles to actuate brakes. However, it will be understood that the latch member 54, may comprise an electrically operated solenoid, a hydraulic cylinder, or the like, as may be dictated by particular requirements.

It will be noted that the particulate material delivery vehicle 10 further comprises a plate 58 mounted at the extreme rear end of the discharge chute 20. The plate 58 is pivotally supported and occupies the same position as the tailgate of some particulate material delivery vehicles. However, the plate 58 is not a tailgate in that it is never latched and does not function to retain particulate material in the particulate material delivery vehicle 10. Quite to the contrary, the plate 58 is pivoted out of the normal position illustrated in FIG. 1 by particulate material flowing out of the particulate material receiving hopper 18 and through the discharge chute 20 under the action of the conveyor 22. By this means there is provided an output indicative of the rate at which particulate material is being unloaded from the particulate material delivery vehicle 10. A more complete understanding of the construction and operation of the plate 58 may be had by referring to the copending application of John H. Holland, Ser. No. 203,739, filed Oct. 1, 1971, for Improved Self-Unloading Material Delivery System.

OPERATION

In the use of the particulate material delivery vehicle 10, the plate 44 of the retaining gate 42 is initially latched in the closed position illustrated in full lines in FIG. 1. This is accomplished by engaging the latch pin 56 of the latch mechanism 54 with the hole 52 in the upwardly and rearwardly extending member 50. Thereafter the particulate material receiving hopper 18 of the particulate material delivery vehicle 10 is filled with particulate material which may be a relatively high-slump particulate material such as slip-form concrete. The particulate material delivery vehicle 10 is thereafter operated to transport the particulate material to a delivery site.

During transportation of the particulate material, the plate 44 is maintained in the closed position. The particulate material is therefore retained in the particulate material receiving hopper 18 and is not permitted to flow into the discharge chute 20. This is advantageous in that the weight of the particulate material is maintained substantially forwardly of the wheel assembly 40 which supports the rear end of the semitrailer chassis 12. By this means the amount of particulate material that can be transported in the particulate material delivery vehicle 10 within the limitations imposed by bridge and highway regulations is maximized.

At the delivery site the latch mechanism 54 is actuated to withdraw the latch pin 56 from the hole 52 in the upwardly and rearwardly extending member 50. The conveyor 22 is then actuated to transport particulate material out of the particulate material receiving hopper 18 and through the discharge chute 20 and to discharge the particulate material from the extreme rear end of the particulate material delivery vehicle 10. During operation of the conveyor 22 the baffle 30 in the hopper 18 functions to maintain a preferential shear zone in particulate material in the hopper 18, whereby the conveyor 22 functions to transport particulate material out of the hopper 18 and through the discharge chute 20 at a predetermined height. Simultaneously the baffle support members 34 function to prevent rearward movement of particulate material in the upper portion under the action of the conveyor 22. The conveyor 22 therefore unloads particulate material from the hopper 18 and through the discharge chute 20 at the predetermined height so long as particulate material remains in the hopper 18. The discharge chute 20 functions as part of the metering system in that it provides a "claming section" in which moving material has time in which to assume a uniform cross-section of predictable proportions.

As particulate material is transported out of the particulate material receiving hopper 18 and through the discharge chute 20 by the conveyor 22, the particulate material engages the plate 44 and pivots the plate on the hinge 46 from the closed position shown in full lines in FIG. 1 to the open position shown in dashed lines. It has been found that it is not necessary to latch the plate 44 in the open position, but that it is entirely satisfactory to simply allow the plate to ride on the upper surface of the particulate material as it is unloaded from the delivery vehicle 10. It will be understood, however, that the upwardly and rearwardly extending member 50 may be provided with additional holes similar to the hole 52 and that the latch member 54 may be actuated to engage the pin 56 with such additional holes to retain the plate 44 in the open position, if desired.

The flow of particulate material through the discharge chute 20 under the action of the conveyor 22 also pivots the plate 58 out of the normal position illustrated in FIG. 1 By this means there is provided an output indicative of the rate at which particulate material is being unloaded from the particulate material delivery vehicle 10. The plate 58 is preferably arranged to provide an output observable from a tractor connected to the semitrailer chassis 12 and comprising part of the particulate material delivery vehicle 10. This permits adjustment of the speed of operation of the conveyor 22 until particulate material is being unloaded from the vehicle 10 at the desired rate.

When all of the particulate material has been unloaded from the particulate material delivery vehicle 10 by the conveyor 22, the plate 44 returns to the closed position illustrated in full lines in FIG. 1 under the action of gravity. The latch member 54 is thereupon actuated to engage the latch pin 56 with the hole 52 in the upwardly and rearwardly extending member 50. Thereafter, the foregoing cycle of operation is repeated.

From the foregoing it will be understood that the present invention comprises apparatus for retaining relatively high-slump particulate materials in the particulate material receiving hopper of a particulate material delivery vehicle during transportation of the particulate material. This is advantageous over the prior art in that the weight of the particulate material is maintained relatively forward so as to permit the transportation of a maximum amount of particulate material. Any possibility of jamming of the particulate material in the discharge chute of the vehicle and/or flow of particulate material out of the discharge chute during transportation is also completely eliminated. Finally, the use of the invention eliminates the possibility of flow of particulate material out of the rear end of the discharge chute.

Although particular embodiments of the invention have been illustrated in the accompanying drawings and described in the foregoing detailed description, it will be understood that the invention is not limited to the embodiments disclosed, but is capable of numerous rearrangement, modifications, and substitutions of parts and elements without departing from the spirit of the invention.

I claim:

1. A particulate material delivery vehicle comprising:

chassis means defining a particulate material receiving hopper and a discharge chute extending rearwardly from the hopper;

wheel means mounted under the discharge chute for supporting the rear portion of the chassis means;

conveyor means mounted on the chassis means for transporting particulate material out of the hopper through the discharge chute and for discharging particulate material from the chute at a point behind the wheel means;

gate means mounted on the chassis means in front of a substantial portion of said wheel means between the particulate material receiving hopper and the discharge chute for movement between a closed position wherein it retains particulate material in the hopper and an open position wherein it permits flow of particulate material out of the hopper into the discharge chute; and means for retaining the gate means in the closed position during transportation of particulate material in the particulate material receiving hopper and for releasing the gate means prior to actuation of the conveyor means so that the particulate material from the hopper causes the gate means to move to an open position as the particulate material is unloaded from the hopper.

2. The particulate material delivery vehicle according to claim 1 wherein the gate means comprises a member pivotally supported on the chassis means for movement between a closed position wherein it blocks substantially the entire rear end of the particulate receiving hopper and an open position wherein it is positioned in the discharge chute to permit flow of particulate material out of the particulate material receiving hopper under the action of the conveyor means.

3. The particulate material delivery vehicle according to claim 2 further including baffle means mounted in the particulate receiving hopper to define a preferential shear zone in particulate material in the hopper whereby the conveyor means transports particulate material out of the hopper and through the discharge chute at a predetermined height corresponding to the positioning of the baffle means in the hopper, wherein the gate means comprises a member pivotly supported on the chassis means for movement between a closed position wherein it is located adjacent the rear end of the baffle means and an open position wherein it extends into the discharge chute to permit flow of particulate material out of the hopper under the action of the conveyor means, and further including a cutaway portion formed in the member comprising the gate means in alignment with the baffle means to prevent the accumulation of particulate material between the member and the baffle means.

4. The particulate material delivery vehicle according to claim 1 further characterized by:

opposed side walls and a floor defining the particulate material receiving hopper and the discharge chute;

a baffle mounted in the particulate material receiving hopper between the side walls and above the floor to define a preferential shear zone in particulate material in the hopper whereby the conveyor means transports particulate material out of the hopper through the discharge chute at a predetermined height corresponding to the positioning of the baffle;

means pivotly supporting the gate means on the chassis means for movement between the closed and the open positions;

structure extending rearwardly and upwardly from the rear end of the baffle through the gate means; and latch means mounted on the gate means for cooperation with the upwardly and rearwardly extending structure to secure the gate means in the closed position during the transportation of particulate material in the particulate material receiving hopper and for releasing the gate means for pivotal movement relative to the upwardly and rearwardly extending structure prior to actuation of the conveyor means.

5. In a particulate material delivery vehicle of the type including semitrailer chassis means defining a particulate material receiving hopper having opposed side walls and a floor, said side walls and floor extending rearwardly from the rear end of the hopper to define a discharge chute, rear wheels for supporting the vehicle for transportation and endless conveyor means mounted for movement around a course including a portion extending through the bottom of the hopper and the bottom of the discharge chute to transport particulate material out of the hopper through the discharge chute, the improvement comprising:

gate means supported on the semitrailer chassis means in front of a substantial portion of said wheel means between the particulate material receiving hopper and the discharge chute; and means for retaining the gate means in a closed position wherein it extends between the side walls and the floor and thereby retains particulate material in the hopper and for subsequently releasing the gate means to permit it to move to an open position in response to movement of said particulate material and thereby permitting flow of particulate material out of the hopper and through the discharge chute under the action of the endless conveyor means.

6. The improvement according to claim 5 further including baffle means mounted in the particulate material receiving hopper between the side walls and above the floor to define an increased pressure zone in particulate material in the hopper tending to cause bridging of the particulate material and to define a decreased horizontal pressure zone just beneath the increased pressure zone tending to prevent bridging of particulate material in the hopper and thereby causing the endless conveyor means to transport particulate material out of the hopper and through the discharge chute at a predetermined height corresponding to the vertical positioning of the baffle means in the hopper, wherein the gate means is supported on the semitrailer chassis means adjacent the rear end of the baffle means, and wherein the gate means includes a cutaway portion aligned with the baffle means for preventing the accumulation of particulate material between the gate means and the rear end of the baffle means.

7. The improvement according to claim 6 wherein the retaining means comprises structure extending rearwardly from the baffle means through the cutaway portion of the gate means and latch means mounted on the gate means for engagement with the rearwardly extending structure to retain the gate means in the closed position and for disengagement from the rearwardly extending means to release the gate means for movement to the open position.

8. A particulate material delivery vehicle comprising:

semitrailer chassis means including opposed side walls and a floor defining a particulate material receiving hopper having a generally V-shaped cross-section and extending beyond the rear end of the hopper to define a discharge chute;

wheel means mounted under the discharge chute for supporting the rear end of the semitrailer chassis means;

endless conveyor means mounted on the semitrailer chassis means for movement around a course including a portion extending through the particulate material receiving hopper and the discharge chute to transport particulate material out of the hopper through the discharge chute;

gate means having a shape substantially identical to the cross-section of the particulate receiving hopper;

means supporting the gate means on the semitrailer chassis means in front of a substantial portion of said wheel means for pivotal movement between a closed position wherein it blocks the rear end of the hopper and an open position wherein it extends into the discharge chute to permit flow of particulate material out of the hopper under the operation of the conveyor means, said gate means adapted to be moved to and retained in said open position by particulate material moving out of said hopper and through said chute; and means for retaining the gate means in the closed position during transportation of particulate material in the particulate material receiving hopper and for releasing the gate member to permit it to move to the open position prior to the actuation of the conveyor means to unload particulate material from the hopper.

9. The particulate material delivery vehicle according to claim 8 further including baffle means mounted in the particulate material receiving hopper for cooperation with the side walls to define a zone of increased horizontal pressure in particulate material in the hopper and to define a zone of reduced horizontal pressure just below the increased horizontal pressure zone and thereby forming a preferential shear zone in the particulate material so that the endless conveyor means transports particulate material out of the hopper at a predetermined height corresponding to the positioning of the baffle means in the hopper.

10. The particulate material delivery vehicle according to claim 9 further including structure extending rearwardly and upwardly from the baffle means through a cutaway portion of the gate means and latch means mounted on the gate means and engaging the upwardly and rearwardly extending structure to retain the gate member in the closed position during the transportation of particulate material in the hopper and for releasing the gate means to the open position prior to the actuation of the conveyor means to unload particulate material from the particulate material receiving hopper.

11. A process for delivering high-slump particulate material in a particulate material delivery vehicle comprising a hopper and a discharge chute extending rearwardly from the hopper comprising:
   supporting the vehicle for transportation between a first point substantially rearwardly of the hopper and a second point substantially forward of the hopper;
   blocking the rear end of the hopper in front of said first point;
   filling the hopper with relatively high-slump particulate material;
   transporting the particulate material in the hopper while the rear end of the hopper is blocked and thereby preventing flow of the particulate material rearwardly out of the hopper and into the discharge chute;
   subsequently unblocking the rear end of the hopper; and
   subsequently unloading the particulate material delivery vehicle by transporting particulate material rearwardly out of the hopper and through the discharge chute.

12. The process according to claim 11 wherein the step of blocking the rear end of the hopper is carried out by securing a plate substantially identical in shape to the cross-section of the hopper between the hopper and the discharge chute.

13. The process according to claim 12 wherein the step of unblocking the rear end of the hopper is carried out by releasing the plate for pivotal movement into the discharge chute under the action of particulate material flowing out of the hopper and through the discharge chute.

14. The process according to claim 13 further characterized by unloading particulate material from the hopper by actuating endless conveyor means for movement around a course including a portion extending through the bottom of the particulate material receiving hopper and through the bottom of the discharge chute and thereby transporting particulate material rearwardly out of the hopper and through the discharge chute and discharging the particulate material from the extreme rear end of the discharge chute.

15. A particulate material delivery vehicle comprising:
   a semitrailer chassis means including opposed side walls and a floor defining a particulate material receiving hopper having a generally V-shaped cross-section and extending beyond the rear end of the hopper to define a discharge chute;
   wheel means mounted under the discharge chute for supporting the rear end of the semitrailer chassis means;
   endless conveyor means mounted on the semitrailer chassis means for movement around a course including a portion extending through the particulate material receiving hopper and the discharge chute to transport particulate material out of the hopper through the discharge chute;
   gate means having a shape substantially identical to the cross-section of the particulate receiving hopper;
   means supporting the gate means on the semitrailer chassis means for pivotal movement between a closed position wherein it blocks the rear end of the hopper and an open position wherein it extends into the discharge chute to permit flow of particulate material out of the hopper under the operation of the conveyor means;
   means for retaining the gate means in the closed position during transportation of particulate material in the particulate material receiving hopper and for releasing the gate member to the open position prior the actuation of the conveyor means to unload particulate material from the hopper; and
   baffle means mounted in the particulate material receiving hopper for cooperation with the side walls to define a zone of increased horizontal pressure in particulate material in the hopper and to define a zone of reduced horizontal pressure just below the increased horizontal pressure zone of thereby forming a preferential shear zone in the particulate material so that the endless conveyor means transports particulate material out of the hopper at a predetermined height corresponding to the positioning of the baffle means in the hopper.

16. The particulate material delivery vehicle according to claim 15 further including structure extending rearwardly and upwardly from the baffle means through a cutaway portion of the gate means and latch means mounted on the gate means and engaging the upwardly and rearwardly extending structure to retain the gate member in the closed position during the transportation of particulate material in the hopper and for releasing the gate means to the open position prior to the actuation of the conveyor means to unload particulate material from the particulate material receiving hopper.

* * * * *

UNITED STATES PATENT OFFICE
CERTIFICATE OF CORRECTION

Patent No. 3,811,602     Dated May 21, 1974

Inventor(s) John H. Holland

It is certified that error appears in the above-identified patent and that said Letters Patent are hereby corrected as shown below:

Column 4, line 14, delete "if" and substitute therefor --it--;

Column 6, line 40, delete "Oct." and substitute therefor --Dec.--.

Signed and sealed this 29th day of October 1974.

(SEAL)
Attest:

McCOY M. GIBSON JR.
Attesting Officer

C. MARSHALL DANN
Commissioner of Patents